United States Patent [19]

Takagi

[11] Patent Number: 5,310,024
[45] Date of Patent: May 10, 1994

[54] DISK BRAKE RETURN SPRING

[75] Inventor: Yuichi Takagi, Yamanashi, Japan

[73] Assignee: Tokico Ltd., Kanagawa, Japan

[21] Appl. No.: 37,357

[22] Filed: Mar. 26, 1993

[30] Foreign Application Priority Data

Mar. 27, 1992 [JP] Japan .............................. 4-016858[U]

[51] Int. Cl.$^5$ .............................................. F16D 55/22
[52] U.S. Cl. ................................ 188/72.3; 188/73.36; 188/73.38
[58] Field of Search ................... 188/71.1, 72.3, 73.31, 188/73.38, 73.39, 73.36, 73.37

[56] References Cited

U.S. PATENT DOCUMENTS

| | | |
|---|---|---|
| 4,136,761 | 1/1979 | Burgdorf et al. ............ 188/73.36 X |
| 4,940,119 | 7/1990 | Kondo et al. .................. 188/73.31 |
| 5,069,313 | 12/1991 | Kato et al. ..................... 188/72.3 |
| 5,069,314 | 12/1991 | Madzgalla et al. ............ 188/73.38 X |
| 5,109,959 | 5/1992 | Kondo et al. .................. 188/73.31 |

FOREIGN PATENT DOCUMENTS

| | | |
|---|---|---|
| 0031531 | 3/1981 | Japan ........................... 188/72.3 |
| 0088237 | 5/1985 | Japan ........................... 188/72.3 |
| 2178807 | 2/1987 | United Kingdom ........... 188/73.38 |

Primary Examiner—Robert J. Oberleitner
Assistant Examiner—Peter M. Poon
Attorney, Agent, or Firm—Wenderoth, Lind & Ponack

[57] ABSTRACT

A disk brake wherein the engagement portions of a return spring are prevented from coming out of respective retaining holes formed in the backing plates of friction pads, and at the same time the spring function portion of the return spring is prevented from interfering with the disk. After the caliper has been mounted on the carrier, the return spring is supported at three portions at each end thereof. The spring function portion is contacted by the protuberance, while the proximal end of each engagement portion is contacted by the entrance portion of the associated retaining hole. Further, the distal end of the engagement portion is contacted by the innermost portion of the retaining hole. In addition, the spring function portion of the return spring is bent radially outward of the disk along a recess formed on the inner side of the caliper.

4 Claims, 4 Drawing Sheets

DISK BRAKE RETURN SPRING

BACKGROUND OF THE INVENTION

The present invention relates to a disk brake used for a vehicle or the like. More particularly, the present invention relates to a disk brake that employs a return spring to bias friction pads away from the disk for the purpose of preventing dragging.

In one known form of disk brake, two friction pads have retaining holes respectively provided in their backing plates, and a return spring has at both ends thereof engagement portions which are inserted into the retaining holes, respectively. A portion of the return spring that is defined between the two engagement portions operates as a spring function portion.

In such a disk brake, the retaining holes lie outside the disk pass portion of the caliper. There is therefore possibility that the engagement portions of the return spring will come out of the retaining holes in the backing plates of the friction pads due to vibration or the like. If the gap between the disk and the disk pass portion of the caliper is reduced in order to minimize the possibility of the engagement portions coming out of the retaining holes, the spring function portion of the return spring may interfere with the disk.

SUMMARY OF THE INVENTION

It is an object of the present invention to provide an improved disk brake, which is free from the above-described problems of the prior art.

To this end, the present invention provides a disk brake including a pair of friction pads provided at respective positions which face each other across a disk, a caliper having a disk pass portion extending across the friction pads and moving both the frictions pads toward the disk, and a return spring connecting the friction pads and biasing them away from the disk. The return spring has engagement portions respectively provided at both ends thereof and retained by being inserted into respective retaining holes formed in the friction pads at the ends thereof which are closer to the outer periphery of the disk. The return spring further has a spring function portion provided between the engagement portions to connect them together. The engagement portions are disposed so that after the caliper has been mounted, the engagement portions lie inside the disk pass portion of the caliper in a state where the engagement portions are retained by the retaining holes. The disk brake further includes a protuberance provided on the inner side of the disk pass portion of the caliper circumferentially of the disk along the side edge of the disk pass portion, and a recess formed on the inner side of the disk pass portion so as to extend continuously from the protuberance toward the central portion of the caliper. In addition, first and second angularly bent portions are formed at each end of the return spring in the portion between the engagement portion and the spring function portion so that after the caliper has been mounted, the return spring is in contact at the first bent portion with the entrance portion of the retaining hole, while the spring function portion is in contact with the protuberance at a region including the second bent portion, and the return spring is in contact at the distal end of the engagement portion with the innermost portion of the retaining hole.

The spring function portion of the return spring is preferably preformed so that after the caliper has been mounted, the spring function portion bends radially outward of the disk from the innermost point of the protuberance.

The spring function portion of the return spring preferably has a substantially V-shaped configuration.

DETAILED DESCRIPTION

Figure 4:
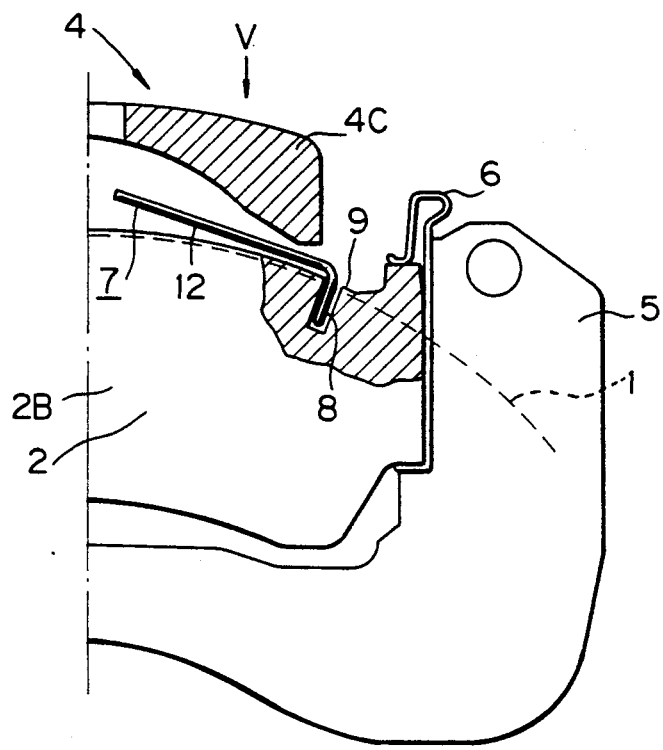
FIG. 4 is a partly-sectioned front view of a conventional disk brake, particularly showing a return spring and its vicinities.
Figure 5:
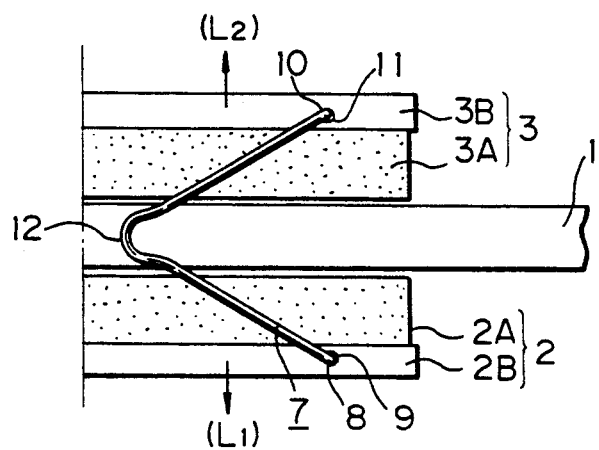
FIG. 5 is a plan view of the conventional disk brake as seen in the direction of the arrow V in FIG. 4, showing the way in which the return spring and friction pads are installed.

FIGS. 4 and 5 show a typical disk brake, which has heretofore been known.

The conventional disk brake has a pair of friction pads 2 and 3 disposed at both sides, respectively, of a disk 1 so as to face each other across the disk 1 and supported to be movable in the axial direction (direction normal to the plane of FIG. 4) of the disk 1. The disk brake further has a caliper 4 that has a disk pass portion 4C extending across the friction pads 2 and 3 and the disk 1. The distal end of the caliper 4 is defined as a claw portion (reaction portion; denoted by reference numeral 4D in FIG. 3) that presses the back of one friction pad 2. In operation, the back of the other friction pad 3 is pressed by a piston (denoted by reference numeral 4E in FIG. 3) incorporated in the caliper 4, and the back of the friction pad 2 is pressed through the claw portion by the reaction resulting from the pressing force applied by the piston, thereby clamping the disk 1 between the two friction pads 2 and 3, and thus braking a wheel or the like.

It should be noted that the friction pads 2 and 3 respectively comprise friction members 2A and 3A that come in sliding contact with the disk 1, and backing plates 2B and 3B for supporting the respective friction members 2A and 3A at the back thereof.

Reference numeral 5 in FIG. 4 denotes a carrier for supporting the caliper 4 and the friction pads 2 and 3. A pad guide 6 is attached to the carrier 5 for supporting the friction pads 2 and 3 so that these pads are movable in the axial direction (direction normal to the plane of FIG. 4) when pressed by the piston.

Further, the friction pads 2 and 3 are provided with a return spring 7 that biases the friction pads 2 and 3 away from the disk 1, thereby preventing dragging of the friction members 2A and 3A of the friction pads 2 and 3 against the disk 1 when the brake is released.

As shown in FIG. 5, the return spring 7 has a pair of engagement portions 8 and 10 respectively provided at both ends thereof. One engagement portion 8 is inserted into a retaining hole 9 provided in the backing plate 2B of one friction pad 2, while the other engagement portion 10 is inserted into a retaining hole 11 provided in the backing plate 3B of the other friction pad 3. In this way, the return spring 7 is retained so that a spring function portion 12 formed in the center thereof biases the backing plates 2B and 3B away from each other.

Thus, when the braking operation effected by the piston in the caliper 4 is canceled, the backing plate 2B of the friction pad 2 is moved in the direction of the arrow $L_1$ by the biasing force from the spring function portion 12 of the return spring 7. Similarly, the backing plate 3B of the friction pad 3 is moved in the direction of the arrow $L_2$ by the biasing force. In other words, when the brake is released, the backing plates 2B and 3B move away from each other, thereby preventing dragging of the friction members 2A and 3A by the disk 1.

In the conventional disk brake, arranged as described above, the positions where the two engagement portions 8 and 10 of the return spring 7 are respectively retained by the retaining holes 9 and 11, which are provided in the backing plates 2B and 3B of the friction pads 2 and 3, lie outside the caliper 4, as shown in FIG. 4, and the engagement portions 8 and 10 of the return spring 7 are merely inserted into the respective retaining holes 9 and 11 of the backing plates 2B and 3B. Accordingly, it is likely that the engagement portions 8 and 10 of the return spring 7 will come out of the retaining holes 9 and 11 of the backing plates 2B and 3B due to vibration or the like and hence the return spring 7 will fall off, although it depends on the dimensions of the relevant members. If the gap between the return spring 7 and the caliper 4 is reduced, the spring function portion 12 of the return spring 7 may interfere with the disk 1.

In view of the above-described circumstances, it is an object of the present invention to provide a disk brake which is designed so that the engagement portions 8 and 10 of the return spring 7 are prevented from coming out of the retaining holes 9 and 11 of the backing plates 2B and 3B even if vibration is applied thereto, and it is also possible to surely prevent the spring function portion 12 of the return spring 7 from interfering with the disk 1.

The arrangement of the present invention will be described below by way of one embodiment and with reference to FIGS. 1 to 3.

It should be noted that members or portions which are common to this embodiment and the prior art shown in FIGS. 4 and 5 are denoted by the same reference numerals, and description thereof is simplified.

In these figures, reference numeral 20 denotes a return spring that is provided between the friction pads 2 and 3 to bias them away from the disk 1.

The return spring 20 has an integral structure comprising an engagement portion 22 (see FIGS. 1 to 3) provided at one end of the return spring 20 and inserted into a retaining hole 21 formed in the outer peripheral surface of the backing plate 2B of the friction pad 2, an engagement portion 24 (see FIG. 3) provided at the other end of the return spring 20 and inserted into a retaining hole 23 formed in the outer peripheral surface of the backing plate 3B of the friction pad 3, and a spring function portion 25 provided between the two engagement portions 22 and 24 to connect them together. The spring function portion 25 biases the backing plates 2B and 3B away from each other, thereby preventing dragging of the friction members 2A and 3A by the disk 1 when the brake is released.

Figure 1:
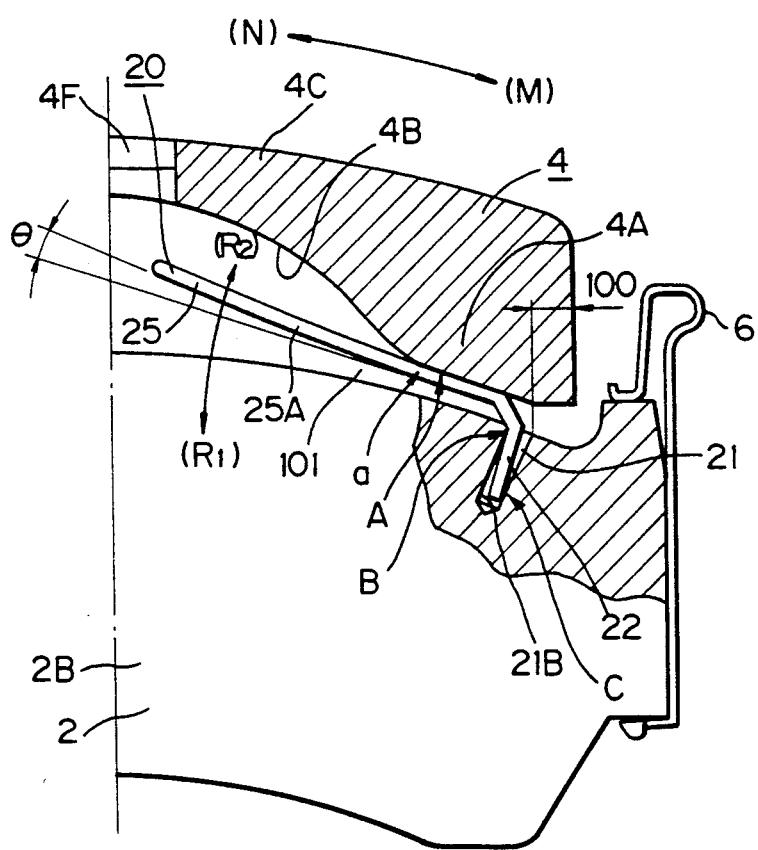
FIG. 1 is a partly-sectioned front view of one embodiment of the disk brake according to the present invention, particularly showing a return spring and its vicinities.

Although in FIG. 1 only one return spring is shown, it will be understood that a similar return spring is also employed for the left-hand half (not shown in the figure) in actual practice.

The retaining holes 21 and 23, which are respectively formed in the backing plates 2 and 3, extend substantially parallel to the plane of the disk 1 as well as inwardly of the disk 1 (downwardly as viewed in FIGS. 1 and 2; a direction normal to the plane of FIG. 3) so that the engagement portions 22 and 24 of the return spring 20 are retained by being inserted into the retaining holes 21 and 23.

The retaining holes 21 and 23 are disposed so that when the caliper 4 has been mounted on the carrier 5, the retaining holes 21 and 23 lie apart from the side edge of the disk pass portion 4C of the caliper 4 in the direction of the arrow (N) by a distance corresponding to the width shown by reference numeral 100 in FIG. 1. By virtue of the described positional relationship between the retaining holes 21 and 23 and the caliper 4, the whole spring function portion 25 of the return spring 20 is disposed inside the disk pass portion 4C of the caliper 4.

In the meantime, the inner side of the disk pass portion 4C of the caliper 4 is provided with a protuberance 4A that presses the spring function portion 25 of the return spring 20 inwardly of the disk 1 (that is, in the direction of the arrow $R_1$). In addition, the disk pass portion 4C of the caliper 4 is formed with a recess 4B that extends continuously in the direction of the arrow (N) from the protuberance 4A toward the central portion of the caliper 4.

The inner surface of the protuberance is generally parallel with the adjacent portion of the periphery of the disk. In practice, the inner surface of the protuberance is machined so that the radius of curvature thereof generally coincides with that of the axis of the disk. Since the circumferential extend of the protuberance is small and the radius of curvature relatively large, the inner surface of the protuberance may be regarded as straight in cross section of FIG. 1 so far as the engagement between itself and the return spring 20 is concerned.

It should be noted that the recess 4B formed on the disk pass portion 4C of the caliper 4 has a curved inner surface which opens to the outside through a window (opening) 4F provided in the center of the disk pass portion 4C. The protuberance 4A has a slant surface which extends in the circumferential direction (N-M) of the disk 1 with an upward slope in the direction of the arrow (N).

Figure 2:
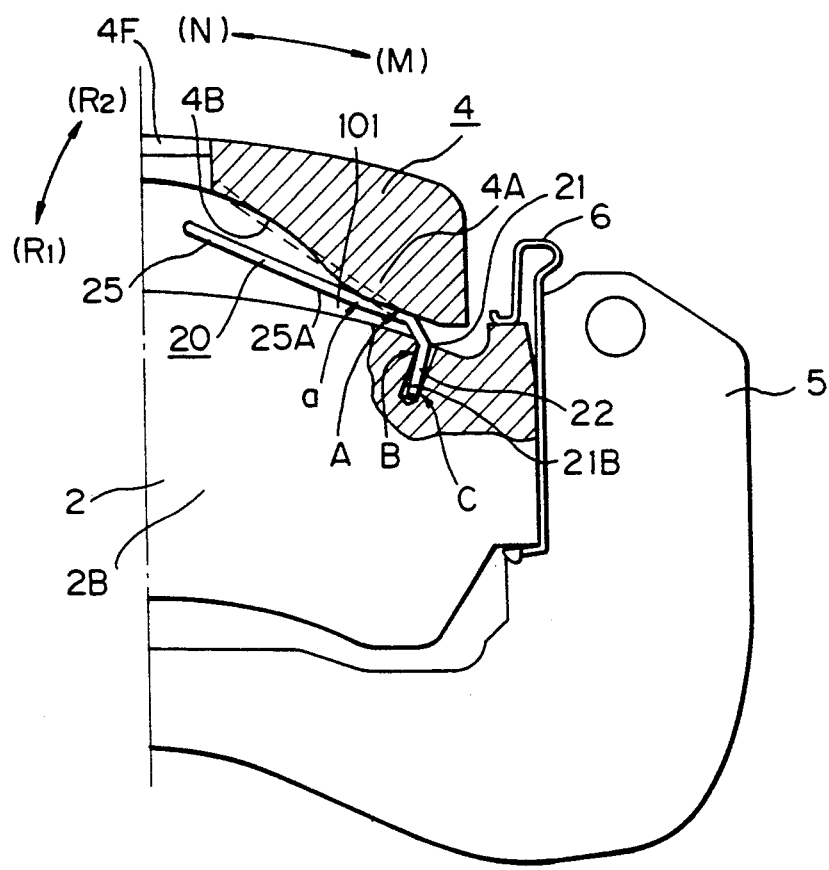
FIG. 2 is a partly-sectioned front view showing the return spring before and after installation of a caliper.

As shown in FIGS. 1 and 2, after the caliper 4 has been mounted on the carrier 5, the spring function portion 25 of the return spring 20 is contacted (shown by reference symbol A) by the protuberance 4A formed on the disk pass portion 4C of the caliper 4, and the proximal end of the engagement portion 22 of the return spring 20 is contacted (shown by reference symbol B) by the entrance portion of the retaining hole 21 formed in the friction pad 2. Further, the distal end of the engagement portion 22 of the return spring 20 is contacted (shown by reference symbol C) by the innermost portion 21B of the retaining hole 21 formed in the friction pad 2. That is, the return spring 20 is supported at one end thereof at three portions thereof as shown by reference symbols A, B and C. In addition, after the installation of the caliper 4, the engagement portion 22 of the return spring 20 lies apart from the side edge of the disk pass portion 4C of the caliper 4 in the direction of the arrow (N) by a distance corresponding to the width shown by reference numeral 100. Consequently, the return spring 20 can be effectively prevented from coming out of the retaining hole 21.

More specifically, first and second angularly bent portions are formed between the engagement portion 22 and the spring function portion 25 of the return spring 20. Thus, after the mounting of the caliper 4, the return spring 20 is in contact at the first bent portion with the entrance portion of the retaining hole 21 (shown by A), while the spring function portion 25 is in contact with the protuberance 4A at a region including the second bent portion. In addition, the return spring 20 is in contact at the distal end of the engagement portion 22 with the innermost portion 21B of the retaining hole 21. By virtue of this arrangement, when the spring function portion 25 is pressed by the protuberance 4A, the engagement portion 22 always enters the retaining hole 21 as far as a predetermined position, so that the return spring 20 is always mounted in a predetermined condition.

Although the return spring supporting structure, in which the return spring 20 is supported at three portions shown by reference symbols A, B and C, has been explained with one engagement portion 22 of the return spring 20 taken as an example, as shown in FIGS. 1 and 2, it should be noted that the other engagement portion 24 of the return spring 20 is also supported by a similar supporting structure as shown by reference symbols A, B and C in FIGS. 1 and 2.

As has been described above, when the caliper 4 is mounted on the carrier 5, the spring function portion 25 of the return spring 20 is contacted by the protuberance 4A formed on the disk pass portion 4C of the caliper 4. In this embodiment, the spring function portion 25 is preformed so that the central portion 25A thereof bends outwardly of the disk 1 (in the direction of the arrow $R_2$) so as to approach the recess 4B over the area from the innermost point "a" of the protuberance 4A to the recess 4B. The angle at which the central portion 25A of the spring function portion 25 is bent at the innermost point "a" of the protuberance 4A is represented by $\theta$ in FIG. 1. More specifically, the spring 20 is preformed such that in a free state of the spring without contacted by the caliper, it bends at the point "a".

Before the caliper 4 is mounted on the carrier 5, the spring function portion 25 of the return spring 20 is disposed as shown by the chain line in FIG. 2.

In the disk brake described above, after the caliper 4 has been mounted on the carrier 5, the spring function portion 25 of the return spring 20 is contacted by the protuberance 4A formed on the inner side of the disk pass portion 4C, as shown by reference symbol A, and in this state, the central portion 25A of the spring function portion 25 bends outwardly of the disk 1 (the direction of the arrow $R_2$) over the area from the protuberance 4A to the recess 4B of the caliper 4. As a result, a gap 101 can be formed between the spring function portion 25 of the return spring 20 and the disk 1. The presence of the gap 101 makes it possible to prevent the spring function portion 25 from interfering with the disk 1 even if the spring function portion 25 vibrates in the arrow directions $R_1$ and $R_2$.

As the friction members 2A and 3A of the friction pads 2 and 3 become worn because of the sliding contact between the disk 1 and the friction pads 2 and 3, the engagement portions 22 and 24 of the return spring 20 approach each other. Even in such a case, since the central portion 25A of the spring function portion 25 is bent outwardly of the disk 1 (in the arrow direction $R_2$) at the angle $\theta$ over the area from the innermost point "a" of the protuberance 4A to the recess 4B of the caliper 4, the central portion 25A of the spring function portion 25 will not lower in the direction of the arrow $R_1$ in excess of the angle $\theta$. In this regard also, interference of the spring function portion 25 with the disk 1 can be effectively prevented.

Figure 3:
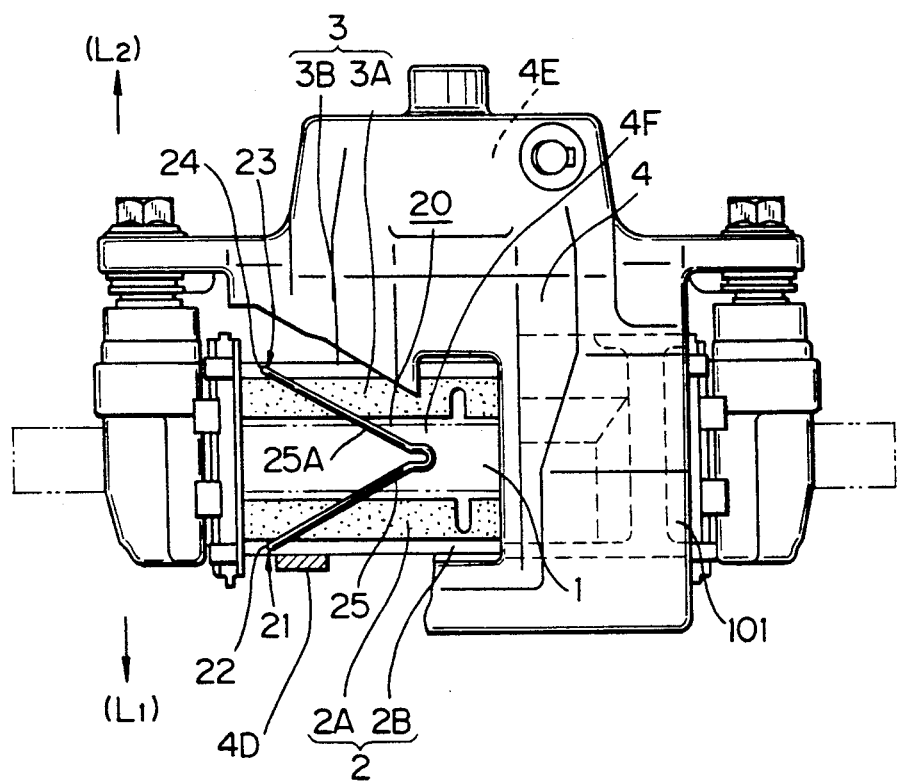
FIG. 3 is a partly-sectioned plan view of the whole disk brake according to the present invention.

Although in this embodiment the spring function portion 25 is formed in a V shape as a whole in a plan view, as shown in FIG. 3, it should be noted that the present invention is not limited to such a configuration and that the spring function portion 25 may be formed in an M shape of other configuration, provided that biasing force can be applied to the engagement portions 22 and 24 so that these portions are biased away from each other.

As will be clear from the foregoing description, the disk brake of the present invention is arranged such that after the mounting of the caliper, the spring function portion of the return spring is contacted by the protuberance formed on the inner side of the disk pass portion of the caliper, and the proximal end of each engagement portion of the return spring is contacted by the entrance portion of the retaining hole formed in the friction pad. Further, the distal end of the engagement portion of the return spring is contacted by the innermost portion of the retaining hole. In other words, the return spring is supported at three portions at each end thereof. In addition, the retained portions of the return spring lie inside the disk pass portion of the caliper after the mounting of the caliper. Consequently, it is possible to prevent effectively the return spring from coming out of the retaining holes. In addition, since the engagement portions can be surely prevented from coming out of the retaining holes, even if large vibration or the like is applied to the return spring, there is no likelihood that the central portion of the spring function portion will move to the disk. Thus, interference of the spring function portion with the disk can be surely prevented.

Further, in a state where the caliper has been mounted, the end portions of the return spring are supported as described above, and the spring function portion of the return spring bends radially outward of the disk over the area from the innermost point of the protuberance to the recess of the caliper. Accordingly, an adequate gap can be surely formed between the spring function portion of the return spring and the disk. By virtue of the presence of the gap, the spring function portion can be effectively prevented from contacting the disk even if the spring function portion vibrates.

Further, since the return spring is covered by the disk pass portion of the caliper, it is possible to prevent foreign matter (e.g., a pebble) from striking on the return spring.

What is claimed is:

1. A disk brake having a pair of friction pads provided at respective positions which face each other across a disk, a caliper having a disk pass portion extending across said friction pads and moving both said frictions pads toward said disk, and a return spring connecting said friction pads and biasing them away from said disk, wherein the improvement comprises said return spring having engagement portions respectively provided at both ends thereof and retained by being inserted into respective retaining holes formed in said friction pads at ends thereof which are closer to the outer periphery of said disk, and a spring function portion provided between said engagement portions to connect them together, said engagement portions being disposed so that after said caliper has been mounted, said engagement portions lie inside said disk pass portion of said caliper in a state where said engagement portions are retained by said retaining holes, a protuberance provided on the inner side of said disk pass portion of said caliper circumferentially of said disk along a side edge of said disk pass portion, a recess formed on the inner side of said disk pass portion so as to extend continuously from said protuberance toward a central portion of said caliper, and first and second angularly bent portions formed at each end of said return spring in the portion between said engagement portion and said spring function portion so that after said caliper has been mounted, said return spring is in contact at said first bent portion with an entrance portion of said retaining hole, while said spring function portion is in contact with said protuberance at a region including said second bent portion, and said return spring is in contact at a distal end of said engagement portion with an innermost portion of said retaining hole.

2. A disk brake according to claim 1, wherein said spring function portion of said return spring is preformed so that after said caliper has been mounted, said spring function portion bends radially outward of said disk from an innermost point of said protuberance.

3. A disk brake according to claim 1, wherein said spring function portion of said return spring has a substantially V-shaped configuration.

4. A disk brake according to claim 1, wherein the inner surface of said protuberance is generally parallel with the adjacent portion of the periphery of the disk.

* * * * *